(12) United States Patent
Buffry et al.

(10) Patent No.: US 10,438,752 B2
(45) Date of Patent: Oct. 8, 2019

(54) CONDUCTIVE ELECTRODES AND THEIR MANUFACTURING PROCESS

(71) Applicant: HUTCHINSON, Paris (FR)

(72) Inventors: Carole Buffry, Pannes (FR); Bruno Dufour, Champagne sur Seine (FR); Elodie Morisset, Montargis (FR); Philippe Sonntag, Avon (FR)

(73) Assignee: HUTCHINSON, Paris (FR)

( * ) Notice: Subject to any disclaimer, the term of this patent is extended or adjusted under 35 U.S.C. 154(b) by 109 days.

(21) Appl. No.: 15/522,981

(22) PCT Filed: Oct. 30, 2015

(86) PCT No.: PCT/EP2015/075209
§ 371 (c)(1),
(2) Date: Apr. 28, 2017

(87) PCT Pub. No.: WO2016/071217
PCT Pub. Date: May 12, 2016

(65) Prior Publication Data
US 2017/0330699 A1    Nov. 16, 2017

(30) Foreign Application Priority Data
Nov. 3, 2014 (FR) ................................. 14 60575

(51) Int. Cl.
*H01G 11/48* (2013.01)
*H01G 11/28* (2013.01)
(Continued)

(52) U.S. Cl.
CPC ............ *H01G 11/48* (2013.01); *H01G 11/28* (2013.01); *H01G 11/68* (2013.01); *H01G 11/86* (2013.01);
(Continued)

(58) Field of Classification Search
CPC ..................... H01M 10/0525; H01M 10/052
See application file for complete search history.

(56) References Cited

U.S. PATENT DOCUMENTS

| 4,562,511 A | 12/1985 | Nishino et al. |
| 6,671,165 B1 | 12/2003 | Nakazawa et al. |

(Continued)

FOREIGN PATENT DOCUMENTS

| EP | 1271671 A1 | 1/2003 |
| EP | 2207188 A1 | 7/2010 |

(Continued)

OTHER PUBLICATIONS

Mar. 3, 2016 Search Report issued in International Application No. PCT/EP2015/075209.

(Continued)

*Primary Examiner* — Olatunji A Godo
(74) *Attorney, Agent, or Firm* — Oliff PLC

(57) ABSTRACT

Electrode for storing electrical energy including a metal current collector and an active material, the current collector being coated on at least one portion of one of its faces with at least one protective layer placed between the current collector and the active material, the protective layer including: (A) a polymer matrix including: (A1) at least one cross-linked epoxy polymer or copolymer, (A2) at least one elastomer, and (B) conductive fillers. This system is used in aqueous electrolyte supercapacitors, the protective layer allowing a very significant reduction in corrosion problems that are generally associated with the use of aqueous electrolytes to be achieved and the adhesion of the active material to the metal collector to be improved.

24 Claims, 2 Drawing Sheets

Figure 1:
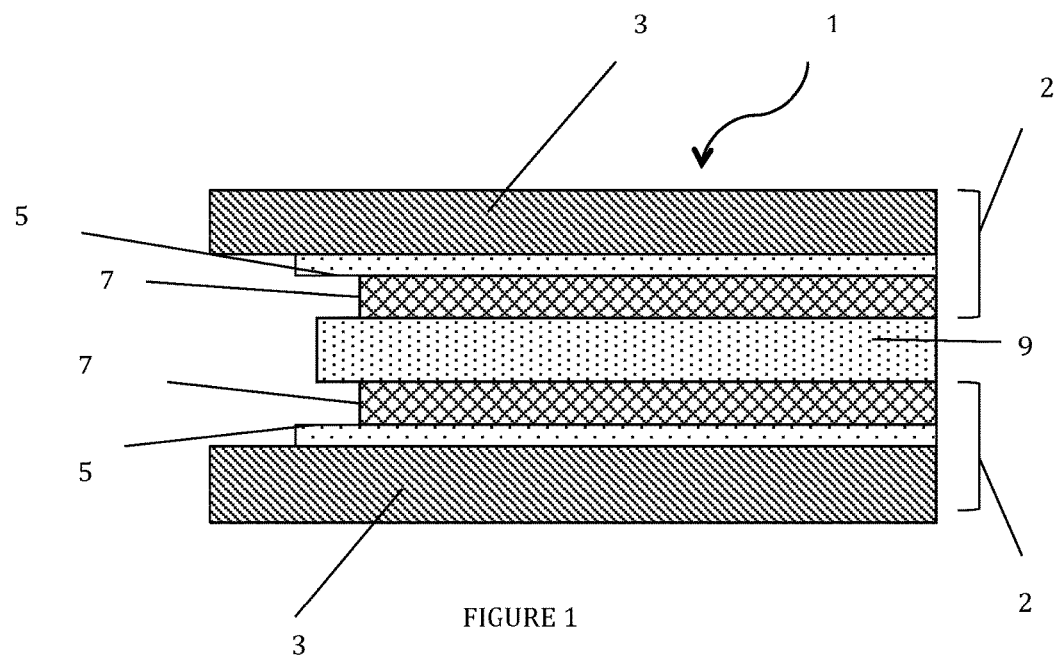

(51) Int. Cl.
  *H01G 11/68* (2013.01)
  *H01G 11/86* (2013.01)
  *H01M 4/62* (2006.01)
  *H01M 4/66* (2006.01)
  *C08F 20/44* (2006.01)
  *C08F 36/06* (2006.01)
  *C08L 47/00* (2006.01)
  *H01G 11/50* (2013.01)

(52) U.S. Cl.
  CPC ........... *H01M 4/625* (2013.01); *H01M 4/661* (2013.01); *C08F 20/44* (2013.01); *C08F 36/06* (2013.01); *C08L 47/00* (2013.01); *H01G 11/50* (2013.01); *Y02E 60/13* (2013.01)

(56) References Cited

U.S. PATENT DOCUMENTS

| | | | |
|---|---|---|---|
| 2005/0207096 A1* | 9/2005 | Hinoki | H01G 11/38 361/502 |
| 2006/0292384 A1 | 12/2006 | Kazaryan et al. | |
| 2009/0155693 A1 | 6/2009 | Portet et al. | |
| 2010/0291442 A1* | 11/2010 | Wang | H01M 4/0404 429/231.95 |
| 2012/0237824 A1 | 9/2012 | Koh et al. | |
| 2013/0176660 A1 | 7/2013 | Dufour et al. | |
| 2014/0153158 A1 | 6/2014 | Dufour et al. | |
| 2014/0162122 A1 | 6/2014 | Kato et al. | |
| 2014/0209480 A1 | 7/2014 | Cheng et al. | |
| 2015/0228982 A1 | 8/2015 | Shibano et al. | |

FOREIGN PATENT DOCUMENTS

| | | |
|---|---|---|
| EP | 2212949 A1 | 8/2010 |
| EP | 2471869 A1 | 7/2012 |
| EP | 2738855 A1 | 6/2014 |
| FR | 2824418 A1 | 11/2002 |
| FR | 2977364 A1 | 1/2013 |
| FR | 2985598 A1 | 7/2013 |
| JP | H05-82396 A | 4/1993 |
| JP | 2000-100441 A | 4/2000 |
| JP | 2011-501383 A | 1/2011 |
| JP | 2003-142105 A | 5/2013 |
| JP | S60-176216 A1 | 7/2013 |
| JP | 2014-199804 A | 10/2014 |
| WO | 02/091407 A2 | 11/2002 |
| WO | 2007/001201 A1 | 1/2007 |
| WO | 2014/042080 A1 | 3/2014 |

OTHER PUBLICATIONS

Mar. 3, 2016 Written Opinion issued in International Application No. PCT/EP2015/075209.

* cited by examiner

CONDUCTIVE ELECTRODES AND THEIR MANUFACTURING PROCESS

The invention relates to the field of electrochemical devices for storage of electrical energy. It notably relates to batteries and supercapacitors. It relates more particularly to electrodes comprising at least one metallic current collector covered with one or more protective layers formulated with an aqueous base, the protective layer being placed between the current collector and the active material. Formulation of the protective layer with an aqueous base offers the advantage of avoiding the use of organic solvents that are flammable, toxic, and harmful to the environment. This system is used in aqueous-electrolyte supercapacitors, where the protective layer gives a very significant reduction of the corrosion problems that are generally associated with the use of aqueous electrolytes. The protective layer can improve the adhesion of the active material on the metallic collector.

The electrodes of the invention may also be used as supercapacitor electrodes operating with an electrolyte of the ionic liquid type. In this case the protective layer makes it possible to improve the adhesion and thus reduce the equivalent series resistance of the active material on the metallic collector.

PRIOR ART

Supercapacitors generally consist of a combination of two conductive electrodes with high specific surface area, immersed in an ionic electrolyte and separated by an insulating membrane called a separator, which allows ionic conductivity and prevents electrical contact between the electrodes. Each electrode comprises at least one metallic current collector and one layer of active material. The metallic current collector allows exchange of electric current with an external system. Under the effect of a potential difference applied between the two electrodes, the ions present within an electrolyte are attracted by the surface that has an opposite charge, thus forming an electrochemical double layer at the interface of each electrode. The electrical energy is thus stored electrostatically by charge separation.

The expression for the capacitance of these supercapacitors is identical to that for classical electrical capacitors, namely:

$$C = E \cdot S / e$$

where E is the permittivity of the medium,
S is the surface area occupied by the double layer, and
e is the thickness of the double layer.

The capacitances attainable in supercapacitors are much larger than those commonly attained by classical capacitors, owing to the fact that porous electrodes with a high specific surface area are used (maximization of surface area) and owing to the extreme narrowness of the electrochemical double layer (a few nanometers).

The energy stored in a supercapacitor is defined by the classical expression for capacitors, i.e.: $E = \frac{1}{2} \cdot C \cdot V^2$, in which V is the electric potential of the supercapacitor.

The capacitance and the potential must therefore be increased to optimize the energy performance. The capacitance depends on the porous texture actually accessible by the electrolyte.

The carbon-containing electrodes used in supercapacitor systems must necessarily be: conductive, to provide transport of the electric charges, porous, to provide transport of the ionic charges and formation of the electrical double layer on a large surface area, and chemically inert, to avoid any energy-consuming parasitic reactions.

The potential mainly depends on the nature of the electrolyte and in particular on the stability of the electrolyte under the influence of the electric field. There are various types of electrolytes. Organic electrolytes, i.e. comprising an organic salt dispersed in an organic solvent allow an operating potential of 2.7V to be reached. However, these electrolytes are expensive, flammable, toxic and potentially polluting. They thus pose problems of safety when used in a vehicle. Aqueous electrolytes are inexpensive and non-flammable, and they are therefore more interesting for this application. In an aqueous medium, the applicable potential is 1.2V. Various aqueous electrolytes may be used, for example an aqueous solution of sulfuric acid, or of potassium chloride, or of potassium sulfate, or of other salts in an acid, basic or neutral medium.

Since the layer of active material is porous, and at least a portion of the electrode is immersed in the electrolyte, the current collector is liable to be corroded by the aqueous electrolyte. Thus, the service life of the electrode is reduced by the lack of corrosion resistance of the current collector.

Moreover, in the case when the collector is made of aluminum, in operation there is formation of a passivation layer consisting of hydrated alumina $Al_2O_3$, $xH_2O$, which protects it against corrosion. However, owing to its ionic and electronic insulating properties, this passivation layer has the effect of increasing the resistance at the aluminum/active material interface.

Moreover, when aluminum constitutes the positive current collector, this layer of alumina grows and becomes denser, with the electric cycles to which the supercapacitor is subjected. When in contact with certain electrolytes, aluminum may even lose its passive character, which leads to its accelerated dissolution.

The same problems were found with other materials forming the current collectors, such as titanium.

Various solutions have been proposed for rectifying all of these problems. Most of them consist of covering the current collector with one or more protective layers, which are placed between the current collector and the active layer.

To provide satisfactory protection of the current collector, the protective layer must be impervious to the electrolyte, so as to prevent it from coming into contact with the metallic collector and corroding the latter. It must be able to provide this protection over the entire operating temperature range of the system, typically up to 60° C. The protective layer must also ensure good electrical contact between the metallic collector and the active material so as to have a minimal equivalent series resistance (ESR) of the supercapacitor. A low ESR is necessary for operation of the supercapacitor at high power. It must have satisfactory adhesion on the metallic material of which the current collector consists. Finally, the weight and the volume of the protective layer must be as small as possible so as to limit the weight and volume of the supercapacitor. Since a favorite configuration for supercapacitor electrodes is a rolled-up configuration, another required property of the electrodes is flexibility. Thus, the protective layer must also display properties of flexibility.

Several protective layers for current collectors are described in the prior art:

To reduce the problems of corrosion and passivation, U.S. Pat. No. 4,562,511 teaches coating an aluminum collector with paint with a filler of conductive particles. However, this paint tends to increase the resistance of the system.

In FR 2824418, a layer of paint comprising conductive particles, such as of graphite or of carbon black, is applied between the collector and the active material, and is then heated to remove the solvent. The paint is based on epoxy polymer and/or polyurethane. This paint is formulated in an organic solvent medium. This layer makes it possible to protect the collector in an organic medium. However, the behavior of a collector of this kind in the presence of an aqueous electrolyte is unknown.

US 2009/0155693 describes a method for forming a thin film of carbon on a current collector by depositing a dispersion of carbon-containing particles in an organic polymer matrix of the sol-gel type followed by removal of the sol-gel by thermal degradation at high temperature. This layer can provide improvement of the conduction properties at the level of the contact. No information is given concerning imperviousness in an aqueous medium. Moreover, the carbon-containing films obtained by this method are fragile and liable to abrasion during assembly of the electrodes.

WO 200701201 and US2006/0292384 describe a protective layer for a metallic collector, consisting of a polymer binder, which may be an epoxy, and carbon-containing conductive fillers in the form of powder. The experimental section describes a lead-based collector and a protective layer based on poly(vinyl chloride). This protective layer is impervious to sulfuric acid. However, the compositions for protecting the collector are formulated in an organic solvent medium. No information is given concerning electrical contact between the metallic collector and the active material. No information is given concerning imperviousness in other aqueous electrolytes, notably 5M lithium nitrate in water.

FR2977364 describes metallic current collectors covered with a protective layer consisting of conductive fillers dispersed in a matrix of copolymer. The system described offers an improvement in electrical contact between the metallic collector and the active material, as well as imperviousness to sulfuric acid. The copolymer employed is based on vinyl chloride and/or vinyl acetate and the protective composition is prepared in an organic medium.

Document US2012/0237824 describes current collectors for lithium battery electrodes with corrosion resistance. The current collector is coated with a protective layer based on fluorinated resin. The protective layer may, moreover, contain the following as additives: fine particles of rubber to improve flexibility, an adhesion promoter such as an epoxy resin, a crosslinking agent of the fluorinated resin in order to reduce its swelling. However, the protective compositions taught by this document are based on organic solvent.

JPH0582396 describes an assembly of a current collector made of a material of the rubber type and a layer of active material, the assembly comprising an intermediate adhesive layer based on carbon black or graphite and a resin, which may be a polycarbodiimide resin, ABS, epoxy, polyphenylene sulfate, urethane, acrylic, or polyester. The adhesive composition is formulated in an organic solvent medium. The active layer is fixed on the current collector by hot pressing on the collector coated with the adhesive.

EP2207188 describes a supercapacitor electrode comprising a layer of active material formulated in an aqueous medium and comprising a conductive material, a carboxymethylcellulose binder and acrylic elastomeric resin.

JP2000100441 describes an electrode for a lithium battery comprising a layer of active material comprising a conductive material, a binder based on thermoplastic crosslinked elastomer, such as a polyester amide.

However, a layer of active material does not have the same characteristics as a protective layer of the current collector. In particular, the layer of active material must have high porosity, in contrast to the protective layer.

At present, no electrodes exist that allow operation of a supercapacitor in an aqueous electrolyte, with a protective coating of the current collector formulated with an aqueous base, the electrode simultaneously having a low ESR, good corrosion resistance, stability at high temperature over a large number of cycles, and satisfactory properties of flexibility.

The invention has made it possible to solve these problems encountered with the electrodes of the prior art.

SUMMARY OF THE INVENTION

The invention relates to an electrode for storing electrical energy comprising a metallic current collector and an active material, the current collector being coated on at least one portion of one of its faces with at least one protective layer placed between the current collector and the active material, characterized in that the protective layer comprises:

(A) A polymer matrix comprising:

(A1) at least one crosslinked epoxy polymer or copolymer, (A2) at least one elastomer, (B) Conductive fillers.

The invention also relates to an electrode fabrication process comprising:

1—Supplying a metallic current collector,

2—Preparing an aqueous composition (G) comprising:

(A1) At least one epoxy polymer or copolymer and at least one crosslinking agent, (A2) At least one elastomer, (B) Conductive fillers, 3—depositing the composition (G) on at least one portion of one face of the current collector, 4—a first thermal treatment for drying the composition (G), 5—a second thermal treatment of the coated current collector at a temperature above the glass transition temperature of the crosslinked epoxy polymer or copolymer (A1), and below the degradation temperature of the crosslinked epoxy polymer or copolymer (A1), 6—depositing a layer of active material on the coated current collector.

The invention also relates to a supercapacitor comprising two electrodes, at least one portion of which is immersed in an ionic electrolyte, the two electrodes being separated by an insulating membrane, at least one of the two electrodes complying with the invention described above and illustrated in detail below.

According to a preferred embodiment, the protective layer is obtained by drying and crosslinking an aqueous composition (G) comprising:

precursors of the polymer matrix (A):

precursors of crosslinked epoxy polymer(s) or copolymer(s) (A1)

at least one elastomer (A2), conductive fillers (B).

According to a preferred embodiment, the protective layer is obtained by drying and crosslinking an aqueous composition (G) consisting essentially of:

precursors of the polymer matrix (A):
  precursors of crosslinked epoxy polymer(s) or copolymer(s) (A1)
  at least one elastomer (A2),
conductive fillers (B).

According to a preferred embodiment, the current collector (3) is made of aluminum or copper.

According to a preferred embodiment, (A2) is selected from: elastomers having a film-forming temperature below 20° C.

According to a preferred embodiment, (A1) is selected from: a crosslinked epoxy polymer, a crosslinked epoxy-alkyd copolymer, a mixture of epoxy polymer and crosslinked alkyd resin.

According to a preferred embodiment, (A1) is a crosslinked epoxy-alkyd copolymer.

According to a preferred embodiment, (A2) is selected from butadiene-acrylonitrile (NBR) latices and polyurethane latices.

According to a preferred embodiment, (B) is selected from: mixtures of carbon black and graphite.

According to a preferred embodiment,
  polymer composition (A) represents from 50 to 70%,
  the conductive fillers (B) represent from 30 to 50%,
  and the sum of the weights of (A) and (B) represents from 95 to 100%, advantageously from 98 to 100%, and preferably from 99 to 100%,
by weight of dry matter, relative to the total weight of dry matter of the protective layer.

According to a preferred embodiment, the protective layer comprises:
  from 30 to 60% of at least one crosslinked epoxy polymer or copolymer (A1),
  from 10 to 30% of at least one elastomer (A2),
  from 30 to 50% of conductive fillers (B),
  and the sum of the weights of (A1), (A2) and (B) represents from 95 to 100%, advantageously from 98 to 100%, and preferably from 99 to 100%,
by weight of dry matter, relative to the total weight of dry matter of the protective layer.

According to a preferred embodiment, the protective layer has a thickness in the range from 5 to 50 μm.

According to a preferred embodiment, a priming coat is placed between the metallic current collector and the protective layer.

According to a preferred embodiment, a priming coat is placed between the protective layer and the active material.

According to a preferred embodiment, the process of the invention further comprises a step of preparing the current collector prior to deposition of composition (G), this step comprising one or more steps selected from: abrasive treatment, chemical treatment.

According to a preferred embodiment of the process of the invention, deposition of composition (G) on the current collector is carried out using a film puller.

According to a preferred embodiment of the process of the invention, the deposition step 3—, followed by drying 4—, is carried out one or more times until a thickness of deposit after drying of from 5 to 50 μm is obtained.

According to a preferred embodiment of the process of the invention, the treatment temperature in step 5—is from 120 to 160° C., preferably from 130 to 150° C.

According to a preferred embodiment of the process of the invention, preparation and deposition of the active material comprises the following substeps:
  (i)—preparing an aqueous composition of active material,
  (ii)—depositing the composition of active material on the protective layer,
  (iii)—thermal treatment of drying.

According to a preferred embodiment of the process of the invention, step 6—of depositing a layer of active material is carried out before step 5—of second thermal treatment.

According to a preferred embodiment of the supercapacitor of the invention, the electrolyte is an aqueous electrolyte.

According to a preferred embodiment of the supercapacitor of the invention, the electrolyte is an ionic liquid.

According to a preferred embodiment of the supercapacitor of the invention, the two electrodes comply with the invention described above and illustrated in detail below.

DETAILED DESCRIPTION

The Current Collector:

As is known, the material used for the current collector may be for example aluminum and aluminum alloys, copper and copper alloys, stainless steel, nickel and nickel alloys, titanium and titanium alloys, and the materials resulting from surface treatment of aluminum or stainless steel or titanium with carbon. Among the latter, aluminum and aluminum alloys, and copper and copper alloys are preferred examples. Advantageously, the current collector is made of aluminum or of copper. These materials may also undergo a surface oxidation treatment before use. The introduction of microrelief on the surface of the current collector by surface treatment is advantageous as it makes it possible to improve the adherence of the material. The thickness of the current collector is generally in the range from 5 to 30 μm.

The Protective Layer:

The protective layer comprises a polymer matrix (A) comprising at least at least one crosslinked epoxy polymer or copolymer (A1), and at least one elastomer (A2). It also comprises a conductive material of the filler type (B).

Preferably, in the protective layer according to the invention:
  the polymer matrix (A) represents from 50 to 70%,
  the conductive fillers (B) represent from 30 to 50%,
  the sum of the weights of (A) and (B) represents from 95 to 100%,
by weight of dry matter, relative to the total weight of dry matter of the protective layer.

Preferably the sum of the weights of (A) and (B) represents from 98 to 100%, even more preferably from 99 to 100%, by weight of dry matter, relative to the total weight of dry matter of the protective layer.

Polymer matrix means, in the sense of the present invention, a material resulting from the drying and optionally crosslinking of polymers, copolymers, crosslinking agents, and additives, such as notably crosslinking catalysts, surfactants, dispersants, and wetting agents.

The polymer matrix is obtained from a polymer composition by drying and crosslinking. In practice, the polymer composition is mixed with the other components, notably the electrically conducting fillers, to form a coating composition or protective composition (G) in the form of an aqueous dispersion. The protective composition is dried and then submitted to a treatment (for example heating) that starts the crosslinking reaction. The polymer matrix forms as a result of this treatment. The protective layer is then obtained.

Advantageously, the protective layer comprises:
  from 30 to 60% of a crosslinked epoxy matrix (A1),
  from 10 to 30% of at least one elastomer (A2),
  from 30 to 50% of conductive fillers (B)

and the sum of the weights of (A1), (A2) and (B) represents from 95 to 100%, by weight of dry matter, relative to the total weight of dry matter of the protective layer.

Preferably the sum of the weights of (A1), (A2) and (B) represents from 98 to 100%, even more preferably from 99 to 100%, by weight of dry matter, relative to the total weight of dry matter of the protective layer.

The Polymer Matrix (A):

The polymer matrix (A) comprises:

(A1) At least one crosslinked epoxy polymer or copolymer, (A2) At least one elastomer.

Polymer matrix preferably means, in the sense of the present invention, a material consisting essentially of polymers, copolymers, crosslinking agents, and additives employed for making this matrix, such as notably crosslinking catalysts, and surfactants.

Preferably, the polymer matrix (A) consists essentially of one or more crosslinked epoxy polymer(s) or copolymer(s), one or more elastomer(s), crosslinking agents, crosslinking catalysts, surfactants, dispersants, and wetting agents.

Preferably, (A1) is selected from: a crosslinked epoxy polymer, a crosslinked epoxy-alkyd copolymer, a mixture of epoxy polymer and crosslinked alkyd resin.

Even more preferably (A1) is a crosslinked epoxy-alkyd copolymer.

As examples of epoxy resin, we may mention:

the glycidyl epoxy resins that are prepared by a condensation reaction of a suitable dihydroxy compound with a diacid or a diamine and with epichlorohydrin, for example the diglycidyl ether of bisphenol A (DGEBA)

the Novolac epoxy resins, which are glycidyl ethers of Novolac phenolic resins. They are obtained by reaction of phenol with formaldehyde in the presence of an acid catalyst to produce a Novolac phenolic resin, followed by a reaction with epichlorohydrin.

As an example of epoxy-alkyd copolymer, we may mention an alkyd resin containing a carboxyl group, with which the epoxy resin has been made to react by a carboxy/epoxy esterification reaction.

Among the crosslinking agents, we may mention the amine crosslinking agents such as melamines, notably hexamethoxymethylmelamine.

Preferably the crosslinking agent represents from 10 to 40%, preferably from 15 to 35%, even better from 20 to 30%, by weight relative to the weight of dry matter of (A1).

Preferably the catalyst is used in an amount ranging from 0.1 to 2.5 wt % relative to the weight of dry matter of the crosslinking agent.

Among the catalysts, we may mention paratoluene sulfonic acid.

Preferably (A1) is a crosslinked epoxy matrix, i.e. a material resulting from the crosslinking of an epoxy polymer composition. Preferably (A1) is a material obtained from a polymer composition of which at least 30 wt % of dry matter consists of epoxy polymer or of epoxy fragments in a copolymer. Preferably (A1) is a material consisting essentially of a crosslinked epoxy polymer or a crosslinked epoxy copolymer or a crosslinked mixture of an epoxy and another polymer, such as an alkyd resin. (A1) may still contain variable amounts of uncrosslinked polymer or copolymer, unreacted crosslinking agent, the catalyst, the surfactant, the wetting agents, and the dispersants.

(A1) is used in the invention in the form of a polymer composition ($C_{A1}$). It is an aqueous composition that comprises the (co)polymer or the mixture of (co)polymers, the crosslinking agent, the catalyst and optionally surfactants. Such compositions are commercially available or may easily be prepared starting from commercially available products.

Preferably the elastomer (A2) is an elastomer or a mixture of elastomers selected from the elastomers having a film-forming temperature below 20° C.

(A2) may be selected from the crosslinked or noncrosslinked elastomers, it may be selected from the natural or synthetic latices, for example butadiene-acrylonitrile (NBR) latices, hydrogenated butadiene-acrylonitrile latices (NBR), polyurethane latices, acrylic latices, styrene-butadiene latices (SBR), butyl latices, acrylonitrile-butadiene-styrene latices (ABS), and mixtures thereof.

(A2) may be crosslinked simultaneously with the crosslinking of (A1), under the effect of one and the same crosslinking agent as (A1) or under the action of a specific crosslinking agent.

Preferably (A2) is selected from butadiene-acrylonitrile (NBR) latices and polyurethane latices.

(A2) is used in the invention in the form of a latex composition ($C_{A2}$). It is an aqueous composition that comprises the elastomer and surfactants. It may further comprise crosslinking agents. Such compositions are available commercially or may easily be prepared starting from commercially available products.

According to a preferred embodiment, the protective layer comprises:

from 30 to 60% of a matrix (A1) selected from: a crosslinked epoxy polymer, a crosslinked epoxy-alkyd copolymer, a mixture of epoxy polymer and crosslinked alkyd resin, from 10 to 30% of at least one elastomer (A2) selected from: butadiene-acrylonitrile (NBR) latices and polyurethane latices, from 30 to 50% of conductive fillers (B) and the sum of the weights of (A1), (A2) and (B) represents from 95 to 100%, advantageously 98 to 100%, even more preferably from 99 to 100%, by weight of dry matter, relative to the total weight of dry matter of the protective layer.

Composition (G):

According to the invention, the protective layer is obtained by drying and crosslinking an aqueous composition (G) comprising:

precursors of the polymer matrix (A):
  precursors of crosslinked epoxy polymer(s) or copolymer(s) (A1)
  at least one elastomer (A2),
conductive fillers (B).

Preferably, in the aqueous composition (G):

the precursors of the polymer matrix (A) represent from 50 to 70%, the conductive fillers (B) represent from 30 to 50%, the sum of the weights of (A) and (B) represents from 95 to 100%, by weight of dry matter, relative to the total weight of dry matter of the aqueous composition (G).

Preferably, the sum of the weights of (A) and (B) represents from 98 to 100%, even better from 99 to 100 wt % of dry matter, relative to the total weight of dry matter of the aqueous composition (G).

Advantageously, the aqueous composition (G) comprises:

from 30 to 60% of precursors of a crosslinked epoxy matrix (A1), from 10 to 30% of at least one elastomer (A2), from 30 to 50% of conductive fillers (B)

and the sum of the weights of (A1), (A2) and (B) represents from 95 to 100%, by weight of dry matter, relative to the total weight of dry matter of the aqueous composition (G).

Preferably, the sum of the weights of (A1), (A2) and (B) represents from 98 to 100%, even better from 99 to 100 wt % of dry matter, relative to the total weight of dry matter of the aqueous composition (G).

According to a preferred embodiment, the aqueous composition (G) comprises:

from 30 to 60% of precursors of a crosslinked epoxy matrix (A1), (A1) being selected from: a crosslinked epoxy polymer, a crosslinked epoxy-alkyd copolymer, a mixture of epoxy polymer and crosslinked alkyd resin, from 10 to 30% of at least one elastomer (A2) selected from: butadiene-acrylonitrile (NBR) latices and polyurethane latices, from 30 to 50% of conductive fillers (B)
and the sum of the weights of (A1), (A2) and (B) represents from 95 to 100%, advantageously 98 to 100%, even more preferably from 99 to 100%,
by weight of dry matter, relative to the total weight of dry matter of the aqueous composition (G).

"Precursors of the polymer matrix" means the monomers, prepolymers, polymers and copolymers, the crosslinking agents and the additives used for making this matrix, such as notably crosslinking catalysts, surfactants, dispersants, and wetting agents.

The proportion of the components of the protective layer is controlled by the choice of the proportions of the components of the protective composition (G).

The thermal treatment is carried out in a known manner at a temperature and for a sufficient duration to cause crosslinking of the epoxy polymer(s) or copolymer(s).

The aqueous composition (G) may be prepared by mixing the various constituents of ($C_{A1}$), ($C_{A2}$) and (B) in any order: for example the conductive fillers may be introduced partly in ($C_{A1}$) and ($C_{A2}$) before mixing the latter or they may be introduced after mixing ($C_{A1}$) and ($C_{A2}$).

To facilitate the production of a stable and homogeneous composition, surfactants, dispersants, wetting agents and water-miscible solvents such as alcohols, notably ethanol or isopropanol, may be incorporated therein in a manner that is known by a person skilled in the art.

The aqueous composition (G) has a dry extract that is advantageously from 25 to 50%, preferably from 30 to 45 wt %. The choice of dry extract is adapted by a person skilled in the art in relation to the method of application of the composition.

Conductive Filler:

"Electrically conducting filler" means, in the sense of the invention, a filler having a volume resistivity from $1 \times 10^{-9}$ to 1 Ω·cm. The preferred volume resistivity is from $1 \times 10^{-6}$ to $1 \times 10^{-1}$ Ω·cm.

The electrically conducting filler may be selected for example from electrically conducting carbon fillers.

These electrically conducting fillers may be in the form of particles, in the form of fibers, or a mixture of different types of fillers.

Among the carbon fillers in the form of particles, we may mention carbon black, acetylene black, nanoporous carbon, graphite (natural graphite, artificial graphite). An average primary particle diameter from 0.002 to 20 μm and in particular from 0.025 to 10 μm is preferred for obtaining high electrical conductivity.

Among the carbon fillers in the form of fibers, we may mention carbon fibers, carbon nanotubes, and carbon nanofibers.

The conductive filler preferably consists of at least one filler selected from the group consisting of carbon black, acetylene black, nanoporous carbon, graphite, carbon fibers, carbon nanotubes, and carbon nanofibers. Preferably the invention is carried out with a filler selected from: mixtures of carbon black and graphite. Advantageously, mixtures having a carbon black/graphite weight ratio from 4/1 to 1/1 are selected as the conductive filler.

The electrically conducting filler is preferably incorporated in amounts in the range from 30 to 50 wt % of dry matter relative to the weight of dry matter of the protective composition or aqueous composition (G).

It is preferable to use at least 30 wt % of electrically conducting fillers to obtain a satisfactory electrical conductivity of the protective layer. However, production of the composition is problematic when more than 50 wt % of electrically conducting fillers is used: ease of mixing, stability of the coating during deposition and during drying.

Surfactants:

Advantageously, the aqueous composition (G) comprises at least one surfactant. Surfactants may be employed for performing several functions in the electrically conducting protective layer. They may be introduced in ($C_{A1}$), in ($C_{A2}$) and/or after mixing ($C_{A1}$), ($C_{A2}$) and (B).

Their role mainly resides in the formulation of the composition in the wet state, before and during application on the current collector, for, non-exhaustively: improving the dispersibility of the electrically conducting filler, improving the stability of the polymers and copolymers in the composition, and improving the spreading properties of the coating. Certain surfactants evaporate during the thermal treatment, but others remain in the protective composition.

Other Components:

Non-electrically-conducting fillers may also be used in the protective composition in addition to the electrically conducting filler. Examples of fillers that do not conduct electricity are: non-electrically-conducting carbon; inorganic oxides; resins. The nature and the amount of fillers are selected in relation to the application properties (rheology) and the service properties (properties of adhesion, electrical resistance) of the electrically conducting protective layer.

The following may also be used in the protective composition, non-exhaustively: an adhesion promoter for improving the adherence between the current collector and the electrically conducting layer.

Among the adhesion promoters, we may mention for example an acrylic polymer or an acrylic olefin copolymer.

These components may be introduced in ($C_{A1}$), in ($C_{A2}$), may be mixed with the conductive fillers (B) and/or may be introduced after mixing ($C_{A1}$), ($C_{A2}$) and (B).

Preferably, the other components represent at most 5 wt % of the total weight of the coating layer and of the aqueous composition (G), based on dry matter. Advantageously, they represent at most 2 wt % and even better 1 wt % of the total weight of the coating layer and of the aqueous composition (G), based on dry matter.

Additional Layers:

The protective layer is placed between the current collector and the active material. It may also be envisaged that a priming coat is placed between the metallic current collector and the protective layer, said priming coat comprising a water-dispersible binder and conductive fillers. For example, the water-dispersible binder may be a polyurethane latex.

The priming coat may comprise:

from 60 to 70% of at least one water-dispersible binder, from 30 to 40% of conductive fillers, by weight relative to the total weight of the priming coat, based on dry matter, with the water-dispersible binder and the conductive fillers representing from 95 to 100% of the dry matter of the priming coat.

According to another variant, a priming coat may be placed between the protective layer and the active layer. This variant is particularly interesting for ionic liquid cells, whose service life it increases. Preferably this layer is of a thickness between 5 and 20 micrometers.

For example, the following steps are carried out, after formation of the protective layer and formation of the active layer:

A step of preparing a composition comprising 60% to 70% of water-dispersible binder, and 30% to 40% of conductive fillers, as a supplement to reach a total of 95 to 100 wt % of dry matter, diluted in an aqueous solvent;

A step of depositing said composition on the protective layer;

A step of drying the metallic current collector.

The operation of depositing and drying a priming coat may be repeated as many times as necessary to obtain the desired thickness.

Electrode Fabrication Process:

The invention also relates to an electrode fabrication process comprising:

1—Supplying a metallic current collector,
2—Preparing an aqueous composition (G) comprising:
At least one epoxy polymer or copolymer and at least one crosslinking agent,
At least one elastomer,
Conductive fillers,
3—depositing composition (G) on at least one portion of one face of the current collector,
4—a first thermal treatment of the current collector coated with (G) at a temperature in the range from 25 to 60° C.,
5—a second thermal treatment of the current collector coated with the dried composition (G), at a temperature above the glass transition temperature of the crosslinked epoxy polymer or copolymer, and below the degradation temperature of the crosslinked epoxy polymer or copolymer,
6—depositing a layer of active material on the current collector coated with the protective layer or the simply dried composition (G).

The aqueous composition (G) used in the process is the one that was described above, the preferred variants of the process corresponding to the variants preferred for the choice of the components of (G).

The process of the invention may comprise, prior to deposition of the aqueous composition (G), preparation of the current collector, this step comprising one or more steps selected from: an abrasive treatment (silicon carbide paper, for example), chemical pickling (for example washing with acetone, washing using a mixture of hydrofluoric acid and nitric acid).

Deposition of composition (G) on the current collector may be carried out in a known manner using a film puller, or by any other method known by a person skilled in the art such as application by brush, rolling etc.

Deposition may be performed on the whole of one face of the current collector or on only a portion. Deposition is performed at least on the portion of the current collector that will be immersed in the electrolyte.

After said deposition, the composition is dried by applying a thermal treatment at a temperature preferably from 25 to 60° C., even better from 30 to 50° C. The treatment is applied for from 15 min to 1 h, preferably about 30 min. This step may for example be carried out in a stove so as to have the benefit of a controlled atmosphere.

The deposition step 3—followed by drying 4—may be carried out just once or it may be repeated so as to increase the thickness of the deposit.

Preferably the deposition step or steps are carried out so as to obtain a thickness of the deposit after drying from 5 to 50 µm.

Once a deposit of the desired thickness has been obtained, a second thermal treatment is carried out at a temperature above the glass transition temperature of the epoxy polymer or copolymer, and below the degradation temperature of the epoxy polymer or copolymer, so as to form a polymer network by reaction of the crosslinking agent with the polymer(s) or the copolymer(s).

Advantageously, the treatment temperature in step 5—is from 120 to 160° C., preferably from 130 to 150° C.

The active material that is used may be selected from the materials known from the prior art for this use, notably those described in application FR 2985598.

In cases when the active material is derived from a carbon-containing aqueous composition, deposition and drying of the active material may comprise the following substeps:

(i)—preparing an aqueous composition of active material for example starting from carbon black, polyvinyl alcohol, poly(acrylic) acid and carboxymethylcellulose,
(ii)—depositing the composition of active material on the protective layer for example using a film puller,
(iii)—thermal treatment of drying, for example for 30 minutes at 50° C.,
(iv)—thermal treatment of crosslinking, for example for 30 minutes at 140° C.

It may be specified that step 6—of depositing a layer of active material is carried out before step 5—of second thermal treatment. After carrying out steps 1—to 4—, steps (i) to (iii) are carried out, and then step 5—of second thermal treatment is applied, for simultaneous crosslinking of the protective layer and of the active layer.

The process of the invention may optionally comprise, between steps 1—and 2—, deposition of a priming coat, as described above, on the current collector, followed by drying of the priming coat.

Electrodes of this kind have advantageous properties when they are used in a supercapacitor. In a capacitor operating with an electrolyte of the ionic liquid type, the function of the protective layer is to improve the adhesion and reduce the equivalent series resistance of the active material on the metallic collector.

In a capacitor operating with an aqueous electrolyte, the function of the protective layer is to protect the current collector against corrosion, improve the adhesion and reduce the equivalent series resistance of the active material on the metallic collector. Thus, it helps to increase the service life of the capacitor.

FIGURES

FIG. 1: schematic representation of the structure of a supercapacitor

Figure 2:
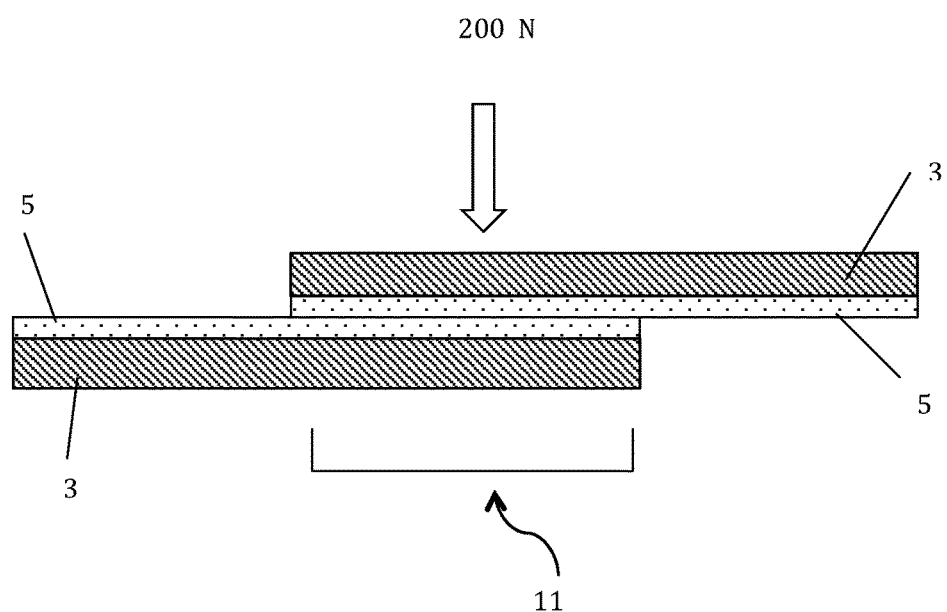

FIG. 2: schematic representation of the setup employed for measuring the transverse resistance (ESR test)

Figure 3:
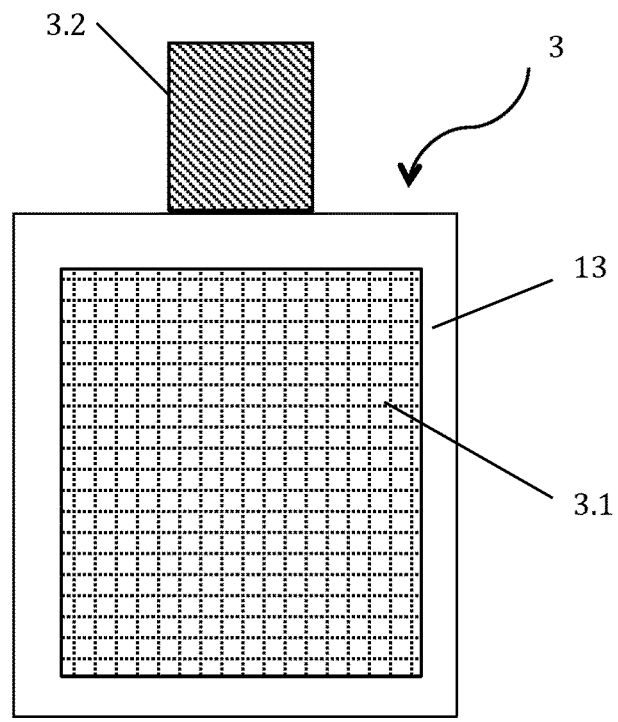
Figure 4:
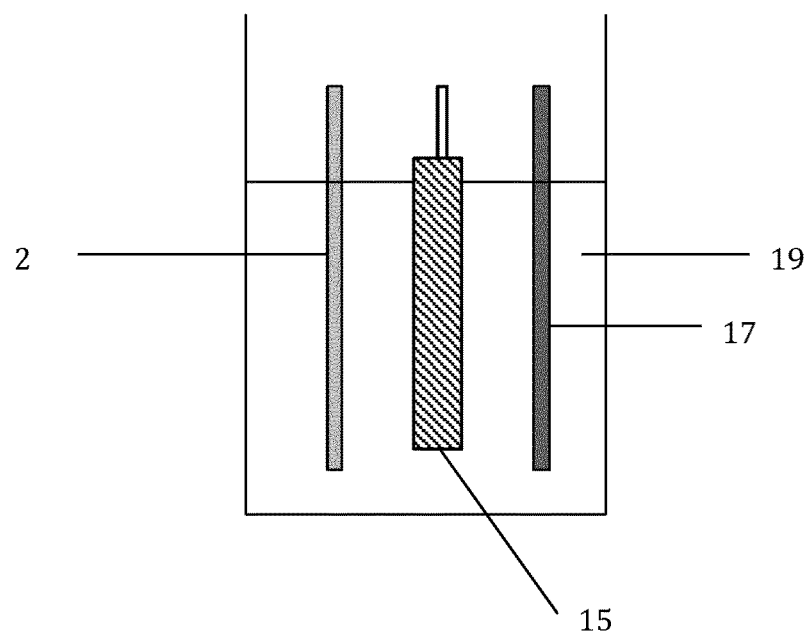

FIG. 3: schematic representation of a test specimen for the dynamic corrosion test FIG. 4: schematic representation of a setup for the dynamic corrosion test In the figures, an identical reference is used to denote an identical element in different diagrams.

FIG. 1 is a schematic representation of the structure of a supercapacitor 1. The supercapacitor 1 comprises two conductive electrodes 2 immersed in an ionic electrolyte (not shown) and separated by an insulating membrane called a separator 9, which allows ionic conductivity and prevents electrical contact between the electrodes 2.

Each electrode 2 comprises a metallic current collector 3, for example made of copper or aluminum, covered with a conductive protective layer 5, for example with a thickness between 5 and 50 micrometers, as well as a monolithic active material 7, for example of carbon, in contact with the separator 9.

The protective layer 5 improves the contact between the current collector and the active layer 7, and protects the metallic current collector 3 from the reactive species present in the electrolyte.

The protective layer 5 is impervious to the aqueous electrolytes notably in an acid medium, for example at a pH less than or equal to 4, or else in a neutral medium at a pH of 7. This imperviousness thus provides protection of the metallic current collector 3 against corrosion in aqueous media, thus preventing any deterioration of electrical contact between said metallic current collector 3 and the monolithic active material 7.

Moreover, the conductive protective layer 5 can also improve electrical contact between said metallic current collector 3 and the monolithic active material 7.

According to a first embodiment, an electrochemical device for energy storage is formed by superposition of a plurality of multilayer unit assemblies like that shown in FIG. 1. This first embodiment typically corresponds to a supercapacitor structure.

The device may be obtained by rolling-up the multilayer unit assembly or by stacking a plurality of multilayer unit assemblies. The assembly thus has a repeating pattern defined by the unit assembly shown in FIG. 1.

Experimental Section:

I—Materials and Methods:

I-1. Materials:

Binder (A1): this is obtained from RESYDROL AX 906 W® resin (CYTEC) by crosslinking. It is a resin dispersed at 35% in an aqueous phase, containing epoxy and alkyd functions. It is crosslinked with a hexamethoxymethyl-melamine in order to form a thermosetting polymer. The crosslinking agent used is CYMEL®303 (CYTEC). This reaction is catalyzed by a para-toluene sulfonic acid, CYCAT 4040® (CYTEC) dispersed beforehand in ethanol.

Binder (A2):

LITEX NX 1200® (SYNTHOMER): butadiene-acrylonitrile latex dispersed at 45% in an aqueous phase or PU6800 (ALBERDINGK): polyurethane latex dispersed in an aqueous phase at 33%.

Fillers: The conductive fillers (B) used are carbon black (ENSACO 260G®) and graphite (TIMCAL, Timrex KS6L®).

Additives: a silicone surfactant is added to the formulation in order to reduce the surface tension and thus improve the wettability of the coating on the substrate. This agent is BYK® 349.

Metal strips: aluminum foil 20 µm thick

In the experimental section, unless stated otherwise, all the ratios are given by weight.

I-2. Methods of Fabrication of the Articles:

Application of the Protective Coating:

55 µm of the protective composition is deposited on the first face of a metal strip using a film puller via an Elcometer®, giving controlled, uniform deposition. After drying for 30 minutes at 50° C., the coated strips are then treated at 140° C. for 30 minutes. The coating thickness is measured using a micrometer, and is between 15 and 20 microns. A second layer is produced in the same way, to get a total thickness of about 35 µm.

Manufacture of Cells:

Application of the coating is the same as described above.

Variant 1 (Electrodes in Tables 7 to 12):

Next, the coated strips intended for the first electrode are coated with 305 µm of active material prepared according to example 1 in application FR 2985598, to give a thickness of active layer of 150 µm after drying for 30 min at 50° C. All of the layers are crosslinked simultaneously for 30 min at 140° C.

The same process is carried out for making the second electrode, with a dry thickness of active material of 90 µm, or wet thickness of 155 µm.

Variant 2 (Electrodes in Table 13):

55 µm of a priming coat defined in table A (formulation 4) is deposited on the coating layer. The metallic current collector is dried for 30 min at a temperature of 50° C. to obtain a layer with a thickness of 20±3 micrometers. The same amount is deposited on both electrodes.

The coated strips intended for the first electrode are coated with 410 µm of active material according to example 1 in application FR 2985598, obtaining a thickness of active layer of 200 µm after drying for 30 min at 50° C. All of the layers are crosslinked simultaneously for 30 minutes at 140° C.

The same process is carried out for the second electrode, with a dry weight of active material on both sides of 150 µm, or 305 µm wet.

The model cells are obtained by assembling the two electrodes, with a cellulosic separator placed between them.

Cell with aqueous electrolyte: the assembly is filled with 5M lithium nitrate electrolyte in water and is protected between two 90 µm heat-sealing plastic films.

Cell with ionic liquid: the assembly is filled, under controlled atmosphere, with 98% EMIM BF4 (1-ethyl-3-methylimidazolium tetrafluoroborate), protected between two 90 µm heat-sealing plastic films.

I-3. Methods for Testing and Characterization:

The coated strips are characterized using four different test methods:

Test 1:

A test of transverse resistance (in mΩ) is carried out by applying pressure (200N) to a square 11 of 3 cm² of two strips of collector 3 coated with a protective layer 5 (FIG. 2).

This measurement gives an idea of the compatibility at the interface of the different layers. The resistance measured must be as low as possible to allow high-power operation of the supercapacitor.

The resistance of the system is evaluated using Ohm's law, U=RI.

The current is fixed at 1 ampere and a potential sweep is performed. A straight line I=f(U) is then obtained. The resistance can be calculated. The software used for processing the data is the EC-Lab® software.

The specification is as follows: Transverse resistance collector+coating <50 mΩ

Test 2:

A winding test around a mandrel can be used for examining the capacity for elongation and adherence of a collector coated with a protective layer. Any damage, for example cracking and/or spalling, is detected visually.

The coating is applied on the metallic collector, in the same conditions as described above. In the test, the test specimen is folded uniformly for 1 to 2 seconds through 180° around the mandrel. Folding is started with the largest folding diameter and the test is continued as far as the diameter for which cracks appear in the coating. In the tests carried out in the context of the invention, this test must be validated for a mandrel with a diameter of 3 mm. The PF 5710 ® reference mandrels are obtained from the company BYK.

The specification is as follows: Crack-free winding around a mandrel with a diameter of 3 mm Test 3: Dynamic Corrosion Measurement at Room Temperature This measurement is based on a 3-electrode setup at 0.8V.
The three electrodes used are (FIG. 4):
a saturated calomel reference electrode 15,
a working electrode 2 (shown in detail in FIG. 3) consisting of the collector 3 covered with the protective coating on a portion of its surface 3.1 and not coated on the portion 3.2 that is not immersed in the electrolyte, coating with a plastic film 13 protects the back (not shown) and the edges of the collector 3
a counter electrode 17 of stainless steel. The three electrodes are immersed in a beaker filled with 180 mL of electrolyte 19.

A current is then passed through the electrodes. In the context of the present invention, the current applied is 0.8 V, because the solution is an aqueous solution.

The aim of this test is to evaluate the variation of the current as a function of time. If I is constant, there is no corrosion, if I is not constant, it means that a phenomenon of corrosion is present.

If the conductive protective coating lasts for 23 h, the test is validated.

The objective of this measurement is to force oxidation and therefore passivation of the aluminum in order to evaluate the performance of the system in conditions as close as possible to real cases. This test is only carried out if all the other tests are validated.

Test 3+: Dynamic Corrosion Measurement at 60° C.

For certain applications, in particular in automobiles when the supercapacitor must be placed near a hot spot, high resistance at temperature, up to 60° C., may be required. That is why a dynamic corrosion test at 60° C. was also carried out in certain cases. This test is optional at present. Its implementation is identical except for the temperature of the setup, which is raised to 60° C. throughout the test. If the conductive protective coating lasts for 40h, the test is validated.

Test 4: Measurement of the Performance of an Electrode in the Cell with Aqueous Electrolyte With a cell comprising the electrodes according to the invention, cycling at room temperature and cycling at 60° C. are carried out. Charge-discharge cycles from 0 to 1.5V are employed. An initial and a final ESR test of the complete system are carried out after 90 000 cycles for the test at room temperature and after 10 000 cycles for the test at 60° C.

The specification is:
ESR final<2×ESR initial for room-temperature cycling >90 000 cycles
ESR final<2×ESR initial for cycling at 60° C.>10 000 cycles.

Test 5: Measurement of the Performance of an Electrode in the Cell with Ionic Electrolyte The test is carried out as test 4 above, with charge-discharge cycles from 0 to 3V. The overall performance of the system (collector+protective coating+active material) is evaluated in closed cells.

The specification is as follows:
Voltage (V)>3
Capacitance (F)>10
ESR (mΩ)<70

Test 6: Scheduled Measurement of the Performance of an Electrode in the Cell with Ionic Electrolyte With a cell comprising the electrodes according to the invention, a DC voltage (3V) is applied at room temperature. The overall performance of the system (collector+coatings+active material) is evaluated in closed cells.

The specification is as follows:
Voltage (V)>3
Capacitance (F)>10
ESR (mΩ)<70

The test is stopped when the cell short-circuits.

II— Making Coatings with a View to Fabrication of a Supercapacitor Operating with an Aqueous Electrolyte:

Examples of formulations for making a conductive protective layer intended for coating a metallic current collector are illustrated below.

II-1. Formulations

Formulation 1 (F1.1 and F1.2): Epoxy Resin Dispersed in an Aqueous Phase

Various compositions, described in Table 1, are mixed to give a paste. The formulation is expressed at 100% before adding the catalyst dispersed in ethanol.

The solvent is water. The dry extract of the complete formulation (including ethanol) is 40%.

TABLE 1

| Composition of formulation 1 | | |
|---|---|---|
| | Formulation 1: | |
| | F1.1 | F1.2 |
| RESYDROL AX906W 35% in water | 42.45 | 43.18 |
| BYK 349 | 0.30 | 0.31 |
| WATER | 31.40 | 31.94 |
| TIMREX KS6L | 6.73 | 6.85 |
| ENSACO 260G | 13.46 | 13.69 |
| CYMEL 303 98% in water | 5.66 | 4.03 |
| Total, wet | 100.00 | 100.00 |
| CYCAT 4040 40% in isopropanol | 0.075 | 0.075 |
| ETHANOL | 10.00 | 10.00 |

The catalyst/crosslinking agent percentage was then varied starting from formulation F1.1.

TABLE 2

| Variants of formulation 1 with variation of the percentage of catalyst in formula F1.1 | | | | | | |
|---|---|---|---|---|---|---|
| | Formulation 1 | | | | | |
| | F1.3 | F1.4 | F1.1 | F1.5 | F1.6 | F1.7 |
| RESYDROL AX906W 35% in water | 42.45 | 42.45 | 42.45 | 42.45 | 42.45 | 42.45 |

TABLE 2-continued

Variants of formulation 1 with variation of the percentage of catalyst in formula F1.1

| | Formulation 1 | | | | | |
|---|---|---|---|---|---|---|
| | F1.3 | F1.4 | F1.1 | F1.5 | F1.6 | F1.7 |
| BYK 349 | 0.30 | 0.30 | 0.30 | 0.30 | 0.30 | 0.30 |
| WATER | 31.40 | 31.40 | 31.40 | 31.40 | 31.40 | 31.40 |
| TIMREX KS6L | 6.73 | 6.73 | 6.73 | 6.73 | 6.73 | 6.73 |
| ENSACO 260G | 13.46 | 13.46 | 13.46 | 13.46 | 13.46 | 13.46 |
| CYMEL 303 98% in water | 5.66 | 5.66 | 5.66 | 5.66 | 5.66 | 5.66 |
| Total, wet | 100.00 | 100.00 | 100.00 | 100.00 | 100.00 | 100.00 |
| CYCAT 4040 | 0.019 | 0.034 | 0.075 | 0.150 | 0.226 | 0.301 |
| ETHANOL | 10.00 | 10.00 | 10.00 | 10.00 | 10.00 | 10.00 |

Formulation 2: Choice and Formulation of a Latex to be Added to Formulation 1

To improve the performance of the formulation based on epoxy resin, a latex formulation selected from those described in Table 3 was added to this paste. These two dispersions were used because they are compatible with the epoxy resin itself dispersed in an aqueous phase.

TABLE 3

Composition based on latex Litex ® and PU

| | Formulation 2 | |
|---|---|---|
| | F2.1 | F2.2 |
| LITEX NX 1200 at 45% | 92.38 | 0 |
| PU 6800 at 33% | 0 | 84.35 |
| TIMREX KS6L | 5.07 | 5.21 |
| ENSACO 260G | 2.55 | 10.43 |
| Total, wet | 100.00 | 100.00 |
| Dry extract | 49% | 44% |

Formulation 3: Coating Compositions Obtained from Mixtures of Formulation 1 and Formulation 2

The formulation 1/formulation 2 wet weight ratio is between 90/10 and 85/15. The coating composition comprising formulation 1+formulation 2 is called formulation 3 and has a dry extract of 37.6%.

TABLE 4

Compositions of formulation 3

| | Formulation 3: | | |
|---|---|---|---|
| | F3.1 | F3.2 | F3.3 |
| F1.1/F2.1 | 85/15 | 0 | 0 |
| F1.2/F2.1 | 0 | 85/15 | 0 |
| F1.2/F2.2 | 0 | 0 | 60/40 |
| Isopropanol | 1.5 | 1.5 | 1.5 |

Starting from formulation F3.1, various catalyst ratios were tested

TABLE 5

Variants of formulation 3 (amount of catalyst)

| | Formulation 3: | | | | | |
|---|---|---|---|---|---|---|
| | F3.4 | F3.5 | F3.1 | F3.6 | F3.7 | F3.8 |
| F1.3/F2.1 | 85/15 | | | | | |
| F1.4/F2.1 | | 85/15 | | | | |
| F1.1/F2.1 | | | 85/15 | 0 | | |
| F1.5/F2.1 | | | 0 | 85/15 | | |
| F1.6/F2.1 | | | | | 85/15 | |
| F1.7/F2.1 | | | | | | 85/15 |
| Isopropanol | 1.5 | 1.5 | 1.5 | 1.5 | 1.5 | 1.5 |

Starting from formulation F3.1, various ratios of flexibilizing base were tested.

TABLE 6

Variants of formulation 3 (latex ratio)

| | Formulation 3: | |
|---|---|---|
| | F3.1 | F3.9 |
| F1.1/F2.1 | 85/15 | 90/10 |
| Isopropanol | 1.5 | 1.5 |

Formulation 4: Priming coat

TABLE A

Formulation 4

| Formulation 4 | Wet weight (g) | Dry weight |
|---|---|---|
| PU 6800 at 33% | 500.00 | 165.00 |
| ENSACO 260G | 60.00 | 60.00 |
| TIMREX KS6L | 30.00 | 30.00 |
| Total | 590.00 | 255.00 |

Dry extract: 45%

II-2. Results:

TABLE 7

Properties of 20 μm aluminums coated with formulation 1

| | Formulation 1 (counter-examples): | | |
|---|---|---|---|
| | F1.1 | F1.2 | Control (*) |
| Test 1: Resistance at 200N (mΩ) | 93 | 74 | 8.0 |
| Test 2: Winding on mandrel Ø = 3 mm | – | – | + |

(*) Uncoated strip

It can be seen that the flexibility of the coating is unsatisfactory. Moreover, its resistance at 200N is too high.

TABLE 8

Properties of 20 μm aluminums coated with formula 3

| | Formulation 3: | | | |
|---|---|---|---|---|
| | F3.1 | F3.2 | F3.3 | Control (*) |
| Test 1: Resistance at 200N according to scheme 1 (mΩ) | 30 | 45 | 31 | 8.0 |

TABLE 8-continued

Properties of 20 μm aluminums coated with formula 3

| | Formulation 3: | | | |
|---|---|---|---|---|
| | F3.1 | F3.2 | F3.3 | Control (*) |
| Test 2: Winding on mandrel Ø = 3 mm | + | + | + | + |
| Test 3: Dynamic corrosion 23 h, RT | + | + | + | − |

(*) Uncoated strip

In order to optimize the crosslinking, a study of the catalyst/crosslinking agent percentage was carried out starting from formulation F3.1.

TABLE 9

Properties of 20 μm aluminums with different catalyst percentages in formulation 3

| | Formulation 3: | | | | | | |
|---|---|---|---|---|---|---|---|
| | F3.4 | F3.5 | F3.1 | F3.6 | F3.7 | F3.8 | Control (*) |
| Test 1: Resistance at 200N according to scheme 1 (mΩ) | 34 | 39 | 30 | 31 | 27 | 38 | 8.0 |
| Test 2: Winding on mandrel Ø = 3 mm | + | + | + | + | + | + | + |
| Test 3: Dynamic corrosion 23 h, RT | + | + | + | + | + | + | − |

(*) Uncoated strip

TABLE 10

Properties of the 20 μm aluminums coated with different ratios of latex base in the formulation

| | Formulation 3: | |
|---|---|---|
| | F3.1 | F3.9 |
| Test 1: Resistance at 200N according to scheme 1 (mΩ) | 30 | 29 |
| Test 2: Winding on mandrel Ø = 3 mm | + | + |
| Test 3: Dynamic corrosion 23 h, RT | + | + |
| Test 3+: Dynamic corrosion 40 h 60° C. 0.8 V | + | + |

As shown by the results given in Tables 8, 9 and 10, the aqueous-based conductive protective layer of formulation 3 makes it possible to lower the resistance of the collector coated with a protective layer and protect the metallic collector against degradation associated with oxygenation in the presence of an aqueous electrolyte.

As stipulated in the specifications, formulas F3.9 and F3.1 passed the 4 characterization tests. Formula F3.1 was evaluated in dynamic corrosion at 60° C.

Cell with Aqueous Electrolyte

TABLE 11 characterization of a cell with an aqueous electrolyte prepared from coating F3.1

| | F3.1 | Control (*) |
|---|---|---|
| Test 5: ESR cells (mΩ) | 37 | /////// |
| Room temperature cycling | >90 000 | ≈0 |
| Cycling at 60° C. | 10 000 | ≈0 |

(*) Uncoated strip with a layer of active material

Cell with Ionic Electrolyte (First Variant):
The cell is tested in accordance with test protocol 5.

TABLE 12 characterization of a cell with ionic liquid prepared from coating F3.1 according to variant 1

| | F3.1 |
|---|---|
| V max (V) | 3 |
| Capa discharge (F) | 9.6 |
| Energy efficiency (%) | 95.4 |
| ESR (mΩ) | 61 |

Cell with Ionic Electrolyte (Second Variant):
The cell is tested in accordance with test protocol 6.

TABLE 13 characterization of a cell with ionic liquid prepared from coating F3.1 + primer according to variant 2

| | F3.1 + primer | Control (*) |
|---|---|---|
| V max (V) | 3 | |
| Capa charge/discharge (F) | 14.7/14.0 | |
| Capacitive efficiency (%) | 95.4 | |
| Energy efficiency (%) | 76.6 | |
| ESR (mΩ) | 48 | |
| Room-temperature cycling | >2000 h | 0 (**) |

(*) Uncoated strip with a layer of active material
(**) Poor adhesion of the material

The invention claimed is:

1. An electrode for electrical energy storage comprising a metallic current collector and an active material layer, the current collector being coated on at least one portion of one of its faces with at least one protective layer placed between the current collector and the active material layer, wherein the protective layer comprises:
   (A) A polymer matrix comprising:
      (A1) At least one crosslinked epoxy polymer or copolymer,
      (A2) At least one elastomer,
   (B) Conductive fillers.

2. The electrode as claimed in claim 1, wherein the protective layer is obtained by drying and crosslinking an aqueous composition (G) comprising:
   precursors of the polymer matrix (A):
      precursors of crosslinked epoxy polymer(s) or copolymer(s) (A1)
      at least one elastomer (A2),
   conductive fillers (B).

3. The electrode as claimed in claim 1, wherein the current collector is made of aluminum or copper.

4. The electrode as claimed in claim 1, wherein (A2) is selected from: the elastomers having a film-forming temperature below 20° C.

5. The electrode as claimed in claim 1, wherein (A1) is selected from: a crosslinked epoxy polymer, a crosslinked epoxy-alkyd copolymer, a mixture of epoxy polymer and crosslinked alkyd resin.

6. The electrode as claimed in claim 5, wherein (A1) is a crosslinked epoxy-alkyd copolymer.

7. The electrode as claimed in claim 1, wherein (A2) is selected from butadiene-acrylonitrile (NBR) latices and polyurethane latices.

8. The electrode as claimed in claim 1, wherein (B) is selected from: mixtures of carbon black and graphite.

9. The electrode as claimed in claim 1, wherein:
the polymer composition (A) represents from 50 to 70%, the conductive fillers (B) represent from 30 to 50%, and the sum of the weights of (A) and (B) represents from 95 to 100%,
by weight of dry matter, relative to the total weight of dry matter of the protective layer.

10. The electrode as claimed in claim 1, wherein the protective layer comprises:
from 30 to 60% of at least one crosslinked epoxy polymer or copolymer (A1),
from 10 to 30% of at least one elastomer (A2),
from 30 to 50% of conductive fillers (B),
the sum of the weights of (A1), (A2) and (B) represents from 95 to 100%,
by weight of dry matter, relative to the total weight of dry matter of the protective layer.

11. The electrode as claimed in claim 1, wherein the protective layer has a thickness in the range from 5 to 50 µm.

12. The electrode as claimed in claim 1, wherein a priming coat is placed between the metallic current collector and the protective layer.

13. The electrode as claimed in claim 1, wherein a priming coat is placed between the protective layer and the active material layer.

14. An electrode fabrication process comprising:
1—supplying a metallic current collector,
2—preparing an aqueous composition (G) comprising:
(A1) at least one epoxy polymer or copolymer and at least one crosslinking agent,
(A2) at least one elastomer,
(B) conductive fillers,
3—depositing the composition (G) on at least one portion of one face of the current collector,
4—a first thermal treatment for drying the composition (G),
5—a second thermal treatment of the coated current collector at a temperature above the glass transition temperature of the crosslinked epoxy polymer or copolymer (A1), and below the degradation temperature of the crosslinked epoxy polymer or copolymer (A1),
6—depositing a layer of active material on the coated current collector.

15. The process as claimed in claim 14, which further comprises a step of preparing the current collector prior to deposition of the composition (G), this step comprising one or more steps selected from: abrasive treatment, chemical treatment.

16. The process as claimed in claim 14, wherein deposition of the composition (G) on the current collector is carried out using a film puller.

17. The process as claimed in claim 14, wherein the deposition step 3—followed by drying 4—is carried out one or more times until a deposit thickness after drying from 5 to 50 µm is obtained.

18. The process as claimed in claim 14, wherein the treatment temperature in step 5 is from 120 to 160° C.

19. The process as claimed in claim 14, wherein preparation and deposition of the active material layer comprises the following substeps:
(i)—preparing an aqueous composition of active material,
(ii)—depositing the composition of active material on the protective layer,
(iii)—thermal treatment for drying.

20. The process as claimed in claim 14, wherein step 6—of depositing a layer of active material is carried out before step 5—of second thermal treatment.

21. A supercapacitor comprising two electrodes, at least one portion of which is immersed in an ionic electrolyte, the two electrodes being separated by an insulating membrane, at least one of the two electrodes being as claimed in claim 1.

22. The supercapacitor as claimed in claim 21, wherein the electrolyte is an aqueous electrolyte.

23. The supercapacitor as claimed in claim 21, wherein the electrolyte is an ionic liquid.

24. The supercapacitor as claimed in claim 21, the two electrodes of which are for electrical energy storage, comprising a metallic current collector and an active material layer, the current collector being coated on at least one portion of one of its faces with at least one protective layer placed between the current collector and the active material layer, wherein the protective layer comprises:
(A) A polymer matrix comprising:
(A1) At least one crosslinked epoxy polymer or copolymer,
(A2) At least one elastomer,
(B) Conductive fillers.

* * * * *